United States Patent [19]

Maloomian

[11] 4,261,012

[45] Apr. 7, 1981

[54] SYSTEM AND METHOD FOR COMPOSITE DISPLAY

[76] Inventor: Laurence G. Maloomian, 28 Crystal Hill Ter., Westwood, Mass. 02090

[21] Appl. No.: 49,819

[22] Filed: Jun. 18, 1979

[51] Int. Cl.³ .............................................. H04N 7/18
[52] U.S. Cl. ...................................... 358/93; 358/181; 358/183
[58] Field of Search ................... 358/22, 93, 181, 182, 358/183, 185, 127

[56] References Cited

U.S. PATENT DOCUMENTS

| | | | |
|---|---|---|---|
| 3,497,614 | 2/1970 | Petrocelli et al. | 358/180 X |
| 3,507,570 | 4/1970 | Bourdier et al. | 353/28 |

Primary Examiner—Robert L. Richardson
Attorney, Agent, or Firm—Thompson, Birch, Gauthier & Samuels

[57] ABSTRACT

An apparatus to allow a prospective consumer of articles of clothing to try on one or more articles of clothing without actually putting the articles of clothing on his or her person. This is accomplished by means of an electronically produced full figure image which is composed of the consumer's head and a model's body, the model's body attired in articles of clothing to be presented. The composite image is viewed by the consumer on a television screen and this gives the effect of the consumer being attired in the articles of clothing presented.

15 Claims, 1 Drawing Figure

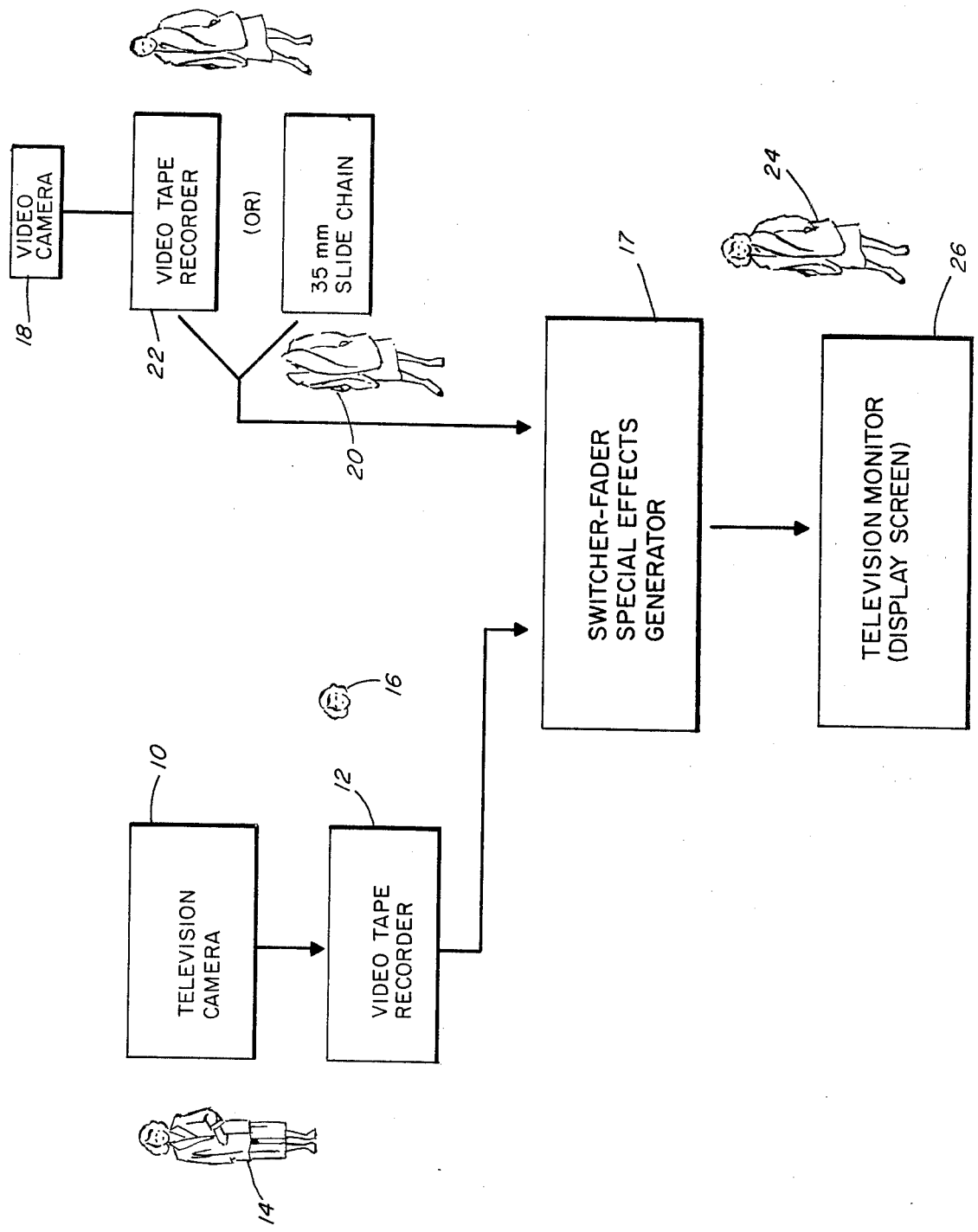

SYSTEM AND METHOD FOR COMPOSITE DISPLAY

BACKGROUND AND BRIEF SUMMARY OF THE INVENTION

This invention relates to a system of the type enabling a subject using the system to view a composite picture showing part of the subject himself (or herself) together with some separate article or object as though the subject were actually wearing such article. For instance, such a system, when used in a ladies bridal salon, might allow a customer to sample the effects of various wedding gowns and choose the most becoming one without actually having to try them on.

Systems of this general kind have already been proposed and have utilized various optical expendients for producing the composite pictures. However, none of such prior art devices so far as known to applicant, have been entirely satisfactory.

Perhaps the simplest type of system used employs a semi-transparent mirror positioned before the subject, with means for positioning the actual articles to be displayed, at a suitable position behind the mirror, so that a subject when looking at the semi-transparent mirror will see the the reflected image of his or her face or figure, together with the article, as seen by transparency through the semi-transparent mirror so that it will appear to be naturally joined with the reflected image. Systems of this kind are advantageously simple, but have the serious drawback that they require a large number of articles, samples or models to physically present, and the system will in many instances involve a prohibited amount of storage space.

Other composite display systems have accordingly been proposed in which these difficulties are eliminated through the use of projection slides for displaying the images of the articles in the composite pictures, thereby dispensing with the need, for a physical presence of the actual articles. Slides of course are much easier to store in large numbers and more convenient to manipulate, than are the articles themselves.

Another system requires a black draped subject looking through a semi-transparent mirror, the reflection of her own face in the mirror is formed on the plane of a screen, together with the projected image of a slide formed by a projector on the screen. The slides represent headless models wearing different articles of clothing whereby the subject appears to see composite pictures of herself as though wearing the articles.

Although this system will allow a full figure composite image, it does so under conditions which are not entirely comfortable for the viewing subject, and has serious drawbacks. For the system to work, it must be used in a darkened room which many people find uncomfortable especially in the presence of strangers (salespeople/system operators). Furthermore, the subject must sit with a black cape on her body from the neck down keeping her head fixed in a preset position so as not to misalign the composite image, additionally, there is an inherent inability to produce a composite image of dark or black skinned people. In producing the reflection of the viewer's face from the mirror, a black cape is used to black out the viewer's body below the neck, this ability of the mirror not to reflect the blacked out part of the viewer's body also makes it impossible for the mirror to reflect adequately a dark or black skinned face. Further, in order to have a common background for the composite image as seen in the mirror, the slides are photographed against a black background which will not allow a high quality (detail) reproduction in the slides of black articles of clothing. With this system, the operator attempts to correspond the body size of the projected image (model's body) to the viewer's body by means of a zoom lens on the projector. Inherently, a zoom lens will increase or decrease the size of its projected image proportionately in all directions. Therefore, with this apparatus, it is impossible to create a short fat image or a tall, thin image but rather only a short thin, tall fat or a well proportioned image in between which may or may not correspond with the viewer's own body. Another drawback of this system is the large amount of space it requires making its use impracticle except in very large stores.

The prior art in this field is best represented by U.S. Pat. No. 1,133,311, wherein the subject's head and a garment are composed on a mirror; U.S. Pat. No. 2,722,600, superimposition of two separate images on a common screen; U.S. Pat. Nos. 2,730,565 and 3,576,945, composite pictures where background scenes are blended with a separate image; U.S. Pat. No. 3,398,664, directed to an automatic photoprocessor, and, U.S. Pat. No. 3,849,596 directed to various techniques for using a television camera for automatic alignment of two images side-by-side.

None of the foregoing references teach a system which is compact, allows the consumer to be photographed in an open area and allows the composite picture to be proportioned along at least one of two axes such that the image of the model's body can be adjusted to be proportioned to the consumer's head.

My invention encompasses a composite display system which overcomes the difficulties of the prior art and which is convenient to use and operate, will enable a full figure, full size display under comfortable conditions for the consumer viewer, can be readily adjusted and operated by the system operator in order to view sequentially a series of composite full figure picture displays at a rate as fast or slow as desired.

My invention is broadly directed to a system for displaying to a consumer, composite views including part of the consumer together with the image of an article as though said article were actually associated with or worn by the consumer which system comprises, means to record a portion of a body of a consumer, means to store the recorded portion of the consumer, means to store a plurality of images which images when combined with the recorded portion of the consumer will provide a full figure display, means to combine the images, means to display the combined images one adjacent to the other, and, means to vary the proportions of at least one image to match with the proportions of the other image in providing the full figure display.

The method of my invention of providing a proportioned full figure image which includes: recording at least a portion of a consumer on a medium, recording at least a portion of an article of clothing on a medium, combining the images to produce a full figure image, varying proportions of one of the images with respect to the other to provide a proportioned full figured composite image.

In the preferred embodiment the system comprising a video camera and a first videotape recorder, a second videotape recorder or slide chain, a switcher fader with a special effects generator and a television monitor. The videocamera takes the image of the consumer which is recorded on the first videotape recorder. Pre-recorded articles of clothing to be combined with the image of the consumer are stored in the second videotape recorder. Both images are combined in the special effects generator and displayer on a television monitor. Through use of the special effects generator, at least one of the images, preferably that of the article of clothing are varied at least along horizontal and vertical axes to provide a proportioned full figured composite.

BRIEF DESCRIPTION OF THE DRAWINGS

The drawing is a block and pictorial diagram representing the preferred embodiment of my invention.

DESCRIPTION OF THE PREFERRED EMBODIMENT

Referring to the drawing, a television camera or video camera 10, such as a Sony Model DXC 1600 communicates with a video playback unit 12, such as a Sony Model KP 7200. The camera 10 only focuses or records the neck and head of a consumer 14 to provide an image 16. This is achieved simply by proper adjustment of the camera lens. The image 16 is transferred to the playback unit 12 where it is fed to a video multiplexer unit 17 such as a special effects generator ISI Model 902. The special effects generator 17 produces a composite output signal of all video input signals arranged in a predetermined synchronized time sequence.

The various articles of clothing are modeled and the portion of the model displaying only the article of clothing that is from the neck down, is recorded by a video camera 18 to provide a second image 20. As many recordings of various articles of clothing as desired are taken and stored in sequence on a videotape recorder 22 GBC 215C. The output images 20 from this videotape recorder 22 is input to the special effects generator 17. The images in the special effects generator 17 are aligned one above the other and the output as a composite 24 is displayed on the screen 26. The proper side-by-side or adjacent alignment or display or two separate video signals feed into such a special effects generator is well known and need not be described in detail. Also the special effects generator referenced above or its equivalent has the ability to vary independently, the displayed portion of either one or both of the two images making up the composite, along vertical and horizontal axes.

Clearly it will only be a rare instance when the view of the consumer's head and neck will be proportional with the previously recorded view of the article of clothing modeled from the neck down. Therefore, the vertical and horizontal adjustments are necessary, as distinguished from those adjustments which are commonly found with a zoom lens. For example, the consumer may be a size 16 and the model a size 10, preferably, the horizontal and vertical axes are adjusted or the article of clothing so that a true proportional full figure composite will be presented to the viewer-consumer.

Alternatively, in view of the video camera 10 and recorder 12 the system operator could take an instant photograph of the consumer's head and neck. The operator could then place this photograph (image) in front of a video camera within the system. The video camera would recognize the image of the consumer's head and feed it directly into the special effects generator 17. The system operator could also make an instant transparency of the consumer's head and then this effect (image) could be placed in a slide chain within the system which would feed directly into the special effects generator. In either of these alternative embodiments, the video camera and videotape recorder can be eliminated. Further, in view of the videotape recorder 22 a slide chain such as a 35 millimeter slide chain such as a Buhl 575-030 as shown in the drawing may be used.

With the above system, it is clear it is not dependent on black in either the background or as a means of eliminating any portion of the consumer's body below the neck. More importantly, the composite image on the display screen can be designed so as to allow the model's image to be adjusted along the vertical and horizontal axes independently of each other so as to reapportion the model's image to any desired width, height combination thereby creating an image more nearly resembling that of the consumer's own body. Further, this system can be viewed under normal interior lighting conditions much the same as home television viewing thereby providing for more comfortable environment for both the consumer and the salesperson. Also, once the consumer's head has been recorded by either the video camera or still photography the consumer is free to assume any position or location comfortable and convenient for viewing the display screen. Still further, because there is no need to record or photograph the articles of clothing against a black background the clothing can be shown against backgrounds which enhance the color of the clothing. In this regard, the system if so designed could allow the composite image to be superimposed over a background which would be a natural setting for the use of the clothing displayed, like an evening gown displayed over the background of a formal ballroom, such as employing the techniques disclosed in U.S. Pat. No. 3,576,945. The consumer's image may be digitized and stored in a computer. The image can be output to switcher fader 17. Lastly, although all of the components have been shown in block diagram form, except for the first video camera, all components may be housed in a single cabinet which requires only a few square feet of floor space will need no special areas or darkened rooms and can be placed anywhere convenient for its use in any sized department or store.

Having described my invention, what I now claim is:
1. A system for displaying a full figure composite display of two separate images which comprises:
   means to record in an ambient environment as a first image a portion of a consumer's body;
   means to record as a second image at least a portion of an article of clothing;
   means to combine said images in adjacent relationship as a full figure composite display;
   means to display said composite; and,
   means to proportion one image with respect to the other which includes means to vary separately one of the images along either a horizontal axis or a vertical axis or both whereby a fully proportioned full figure composite is displayed.
2. The system of claim 1 wherein the first image is disproportional with respect to the second image.
3. The system of claim 1 wherein the means to record the first image includes a video camera in combination with a videotape recorder.
4. The system of claim 1 wherein the means to record includes still photography.

5. The system of claim 1 wherein the means to record the second image includes means to store a plurality of distinct second images.

6. The system of claim 5 wherein the means to record includes a slide chain projector.

7. The system of claim 6 wherein the first image is a common fixed image and the second image is one of a plurality of images and which includes means to display said first image with one of the plurality of second images in timed sequence.

8. The system of claim 7 wherein the means to combine includes a special effects generator.

9. A method for displaying a full figured composite picture of two separate images which includes:
   recording in an ambient environmment a portion of a consumer's body as a first image;
   recording at least a portion of an article of clothing as a second image;
   combining the first and second images in adjacent relationship to provide a full figured composite display;
   displaying the composite; and,
   varying the second image individually along X and Y axes until the second image is proportional to the first.

10. The method of claim 9 which includes:
    providing a plurality of second images each of said images corresponding to a separate article of clothing;
    combining and displaying sequentially the second images with said first image whereby the consumer may view a plurality of articles of clothing on herself/himself.

11. The method of claim 10 which includes recording the first image with a video camera.

12. The method of claim 11 which includes storing said first image on a videotape recorder.

13. The method of claim 9 which includes combining the first and second images in a special effects generator.

14. The method of claim 9 which includes recording the first image as a still photographic image.

15. The method of claim 9 which includes recording the articles of clothing as still photographic images.

* * * * *